July 4, 1961 R. E. YAEGER 2,991,422

PCM DECODERS WITH BIPOLAR OUTPUT

Filed May 13, 1959

4 Sheets-Sheet 1

INVENTOR
R. E. YAEGER
BY R. B. Anderson
ATTORNEY

July 4, 1961 R. E. YAEGER 2,991,422

PCM DECODERS WITH BIPOLAR OUTPUT

Filed May 13, 1959 4 Sheets-Sheet 2

INVENTOR
R. E. YAEGER
BY R. B. Anderson
ATTORNEY

July 4, 1961 R. E. YAEGER 2,991,422

PCM DECODERS WITH BIPOLAR OUTPUT

Filed May 13, 1959 4 Sheets-Sheet 3

INVENTOR
R. E. YAEGER

BY R. B. Ardis

ATTORNEY

July 4, 1961 R. E. YAEGER 2,991,422

PCM DECODERS WITH BIPOLAR OUTPUT

Filed May 13, 1959

4 Sheets-Sheet 4

INVENTOR
R. E. YAEGER
BY R. B. Ardis
ATTORNEY 2,991,422

PCM DECODERS WITH BIPOLAR OUTPUT

Robert E. Yaeger, Topsfield, Mass., assignor to Bell Telephone Laboratories, Incorporated, New York, N.Y., a corporation of New York Filed May 13, 1959, Ser. No. 812,918
6 Claims. (Cl. 328—119)

This invention relates generally to pulse type communication systems and more particularly to pulse code modulation communication systems, in which signal amplitude samples are converted to code groups of marks and spaces for transmission, usually in time division multiplex, and then reconstructed in substantially their original form from the received code groups.

The process of reconstructing the original signal amplitude samples from the received code groups of marks and spaces in a pulse code modulation (often referred to simply as PCM) system is known as decoding. In decoders of the so-called network type, each code group is usually received in serial form, transformed to parallel form in a suitable shift register, and then used to control the transmission of current to a common output bus simultaneously through selected ones of a network of weighting resistors. Normally, each weighting resistor has a value of resistance dependent upon the numerical significance of a different code group digit and is energized or not depending upon whether its digit is a mark or a space in the particular code group received. The resulting signal amplitude samples reconstructed on the common output bus from a succession of PCM code groups, however, are unipolar in form and possess a strong direct current component of varying amplitude. Such unipolar pulses are not suitable for application to such subsequent terminal circuitry as balanced compandors. The direct current component, moreover, is blocked by transformers and capacitors in the following circuitry and, without it, the individual pulses in the reconstructed pulse train cease to be accurate amplitude samples of their respective signals.

An important object of the present invention is, therefore, to eliminate the varying direct current component from the reconstructed signal amplitude samples and to convert them to bipolar form in as simple a manner as possible.

In accordance with a principal feature of the invention, an auxiliary resistor is added to the weighting network of a network type PCM decoder and connected back and forth between opposite sides of the current supply source and the common output bus in phase opposition to the energized weighting resistors. In a decoder in which selected weighting resistors are connected to a first side of the current supply source during the life of each reconstructed signal amplitude sample and to the second during the guard spaces in between, the auxiliary resistor is thus returned from the common output bus to the second side of the current supply source during each sample interval and to the first during each guard space. The reconstructed signal amplitude samples thus appear on the common output bus in bipolar form and have a direct current component greatly reduced in magnitude.

In accordance with a secondary feature of the invention, the auxiliary resistor has a value of resistance substantially equal to that of the smallest of the network weighting resistors. Use of such an auxiliary resistor in embodiments of the invention either reduces the direct current component of the reconstructed signal amplitude samples to substantially zero or converts it into a form permitting its ready removal without effect upon the accuracy of the samples themselves.

A more complete understanding of the invention may be obtained from a study of the following detailed description of several specific embodiments. In the drawings.

Figure 1:
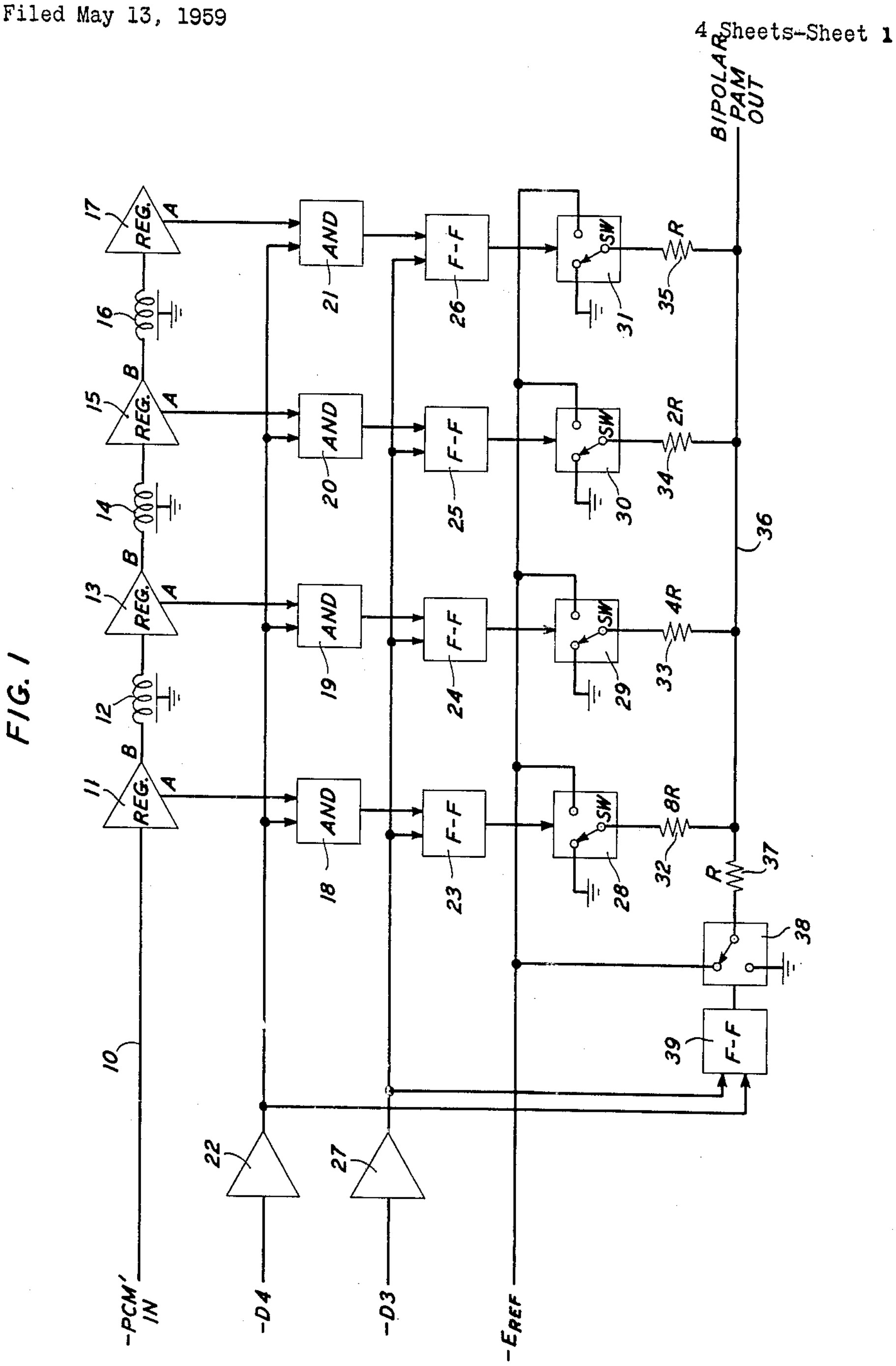
FIG. 1 is a block diagram of a simplified four-digit PCM decoder embodying the present invention.
Figure 3:
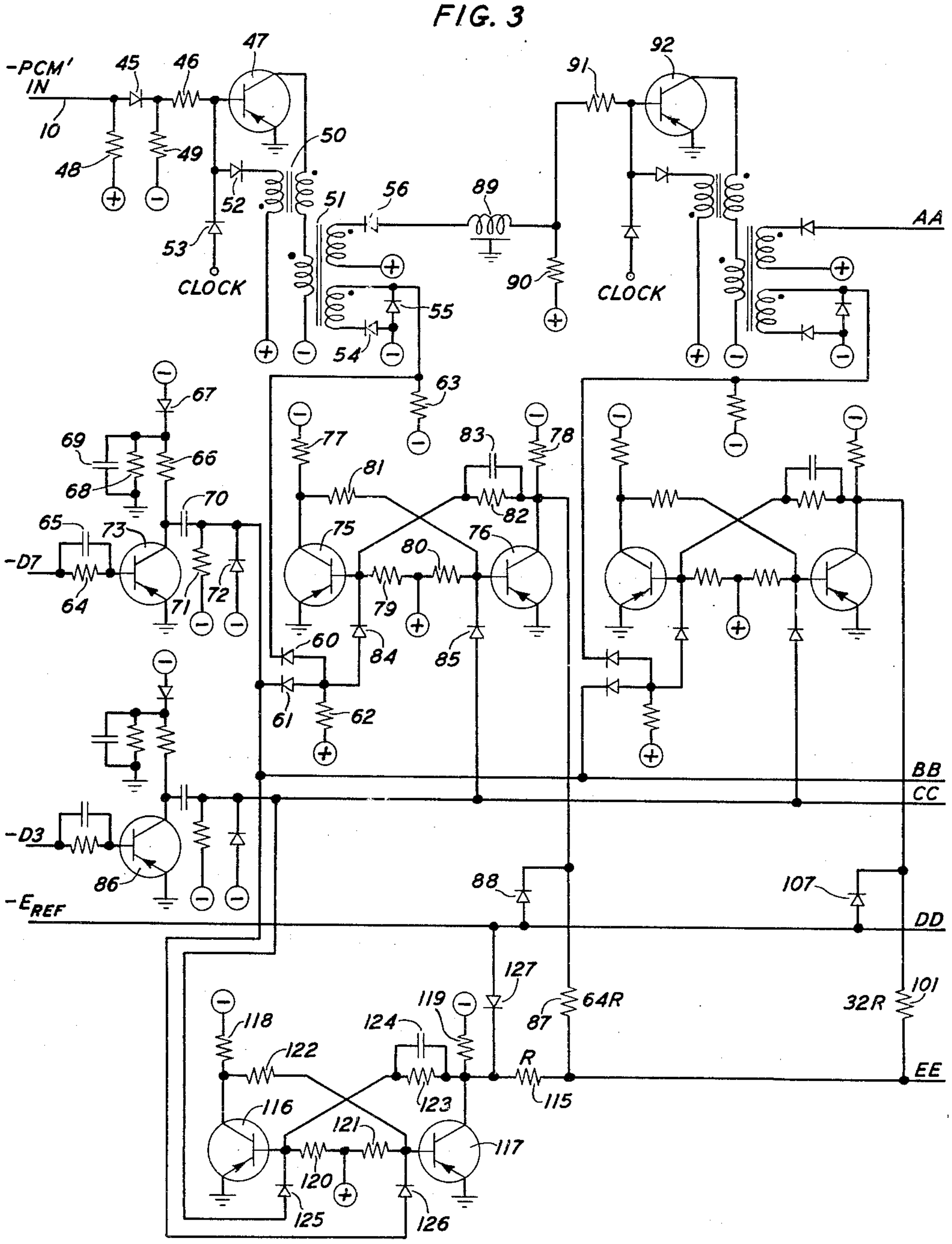
FIGS. 3 and 4, taken together, form a schematic diagram of a full scale commercial quality seven-digit PCM decoder embodying the invention.
Figure 4:
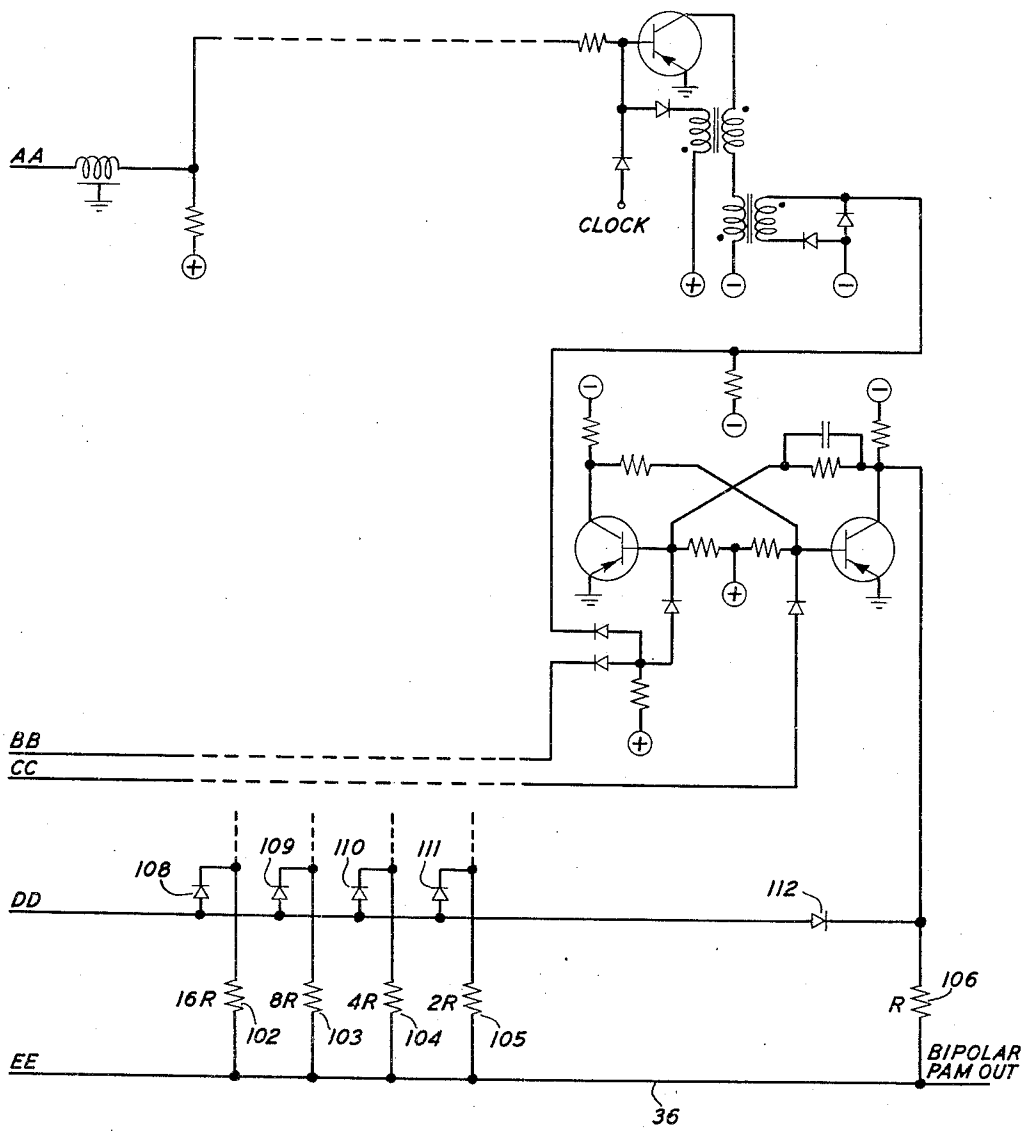

The invention can be explained best by showing first its application to the simplified four-digit PCM decoder illustrated in block diagram form in FIG. 1 and then its use in the full scale seven-digit commercial quality decoder illustrated in FIGS. 3 and 4. In FIG. 1, PCM code groups or their equivalent are received in serial form on an input bus 10 and then converted to parallel form by a shift register composed, in tandem, of a first regenerative pulse amplifier 11, a first one-digit delay line 12, a second regenerative pulse amplifier 13, a second one-digit delay line 14, a third regenerative pulse amplifier 15, a third one-digit delay line 16, and a final regenerative pulse amplifier 17. Each regenerative pulse amplifier has an output lead marked A in FIG. 1 which, in combination with corresponding A output leads from the other amplifiers, forms the parallel output of the shift register. The first three regenerative pulse amplifiers in FIG. 1 have output leads marked B which are used to form the tandem connection to the next following one-digit delay line.

The A output leads of the regenerative pulse amplifiers in FIG. 1 are connected directly to like input terminals of respective AND gates 18, 19, 20, and 21. The AND gates, each of which generates an output only when both of its input terminals are energized, control the termination of each signal amplitude sample reconstructed from an incoming code group by the detector. The other input terminals of the AND gates are energized together through a linear phase-inverting amplifier 22 from the —D4 lead of a suitable timing pulse generator. The significance of the —D4 lead and the nature of the waveform appearing upon it will be explained in due course.

The output leads of the four AND gates in FIG. 1 are connected directly to like input terminals of respective flip-flop or binary counter circuits 23, 24, 25, and 26. These flip-flops control the initiation of each signal amplitude sample reconstructed by the detector. The other input terminals of the flip-flops are energized together through a linear phase-inverting amplifier 27 from the —D3 lead of the timing pulse generator. The significance of the —D3 lead and the nature of the waveform appearing upon it will also be explained in due course.

Finally, the output leads of the flip-flops are connected to control respective switches 28, 29, 30, and 31. These switches may, in fact, be the output stages of the flip-flops themselves but are shown separately in mechanical analog form in FIG. 1 in order to illustrate the mode of operation of the circuit more clearly. As illustrated, each switch performs the function of connecting an output lead either to ground or to a negative fixed reference potential, labeled $-E_{REF}$. When energized by the associated flip-flop each switch connects its output lead to ground. At all other times, the output lead remains connected to the fixed reference potential. The switch output leads are connected through respective network weighting resistors 32, 33, 34, and 35 to an output bus 36. These resistors have values of resistance related to one another by powers of two. Thus, resistor 35, associated with the most significant digit of the received PCM code group, has a resistance value R. Resistor 34, associated with the next most significant digit has a resistance value 2R. Resistors 33 and 32, associated with the remaining two digits, have the resistance values 4R and 8R, respectively.

Figure 2:
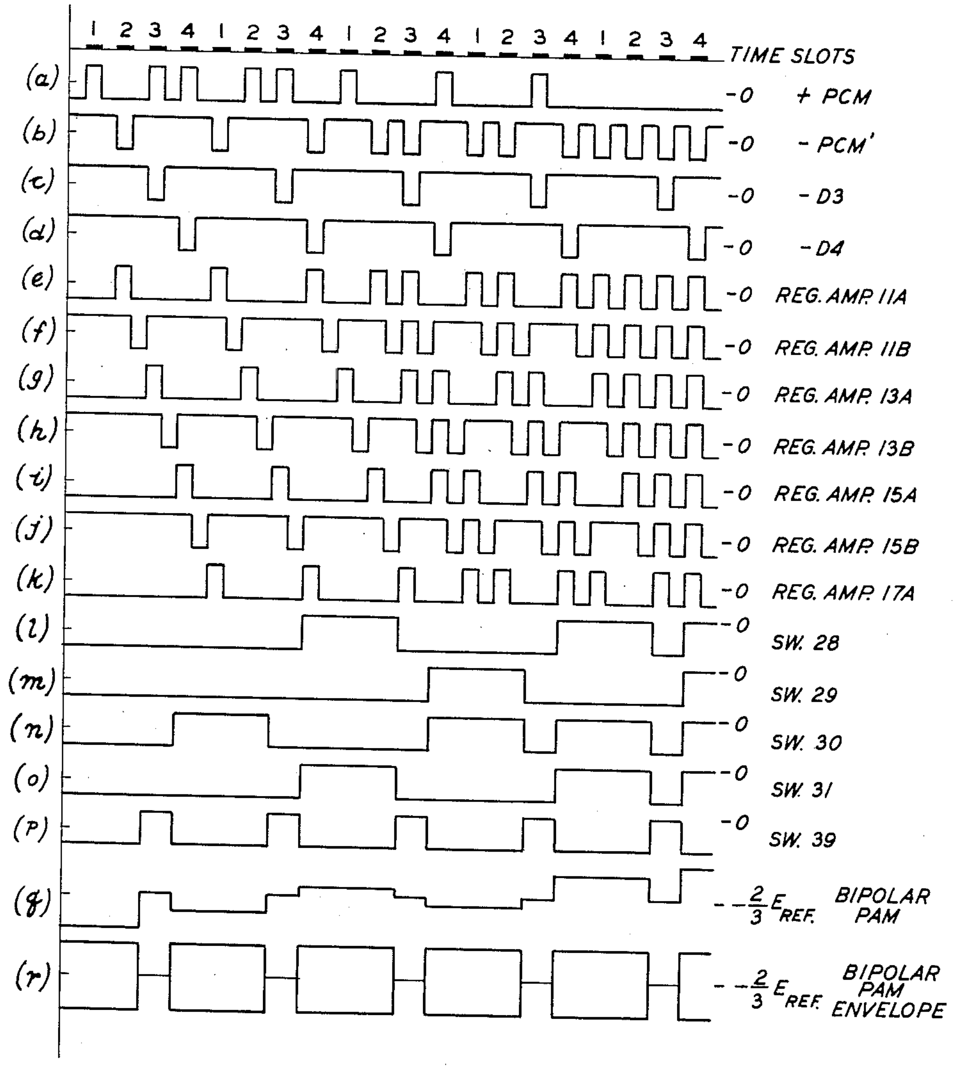
FIG. 2 is a series of waveforms illustrating the principles of operation of the embodiment of the invention shown in FIG. 1.

The portion of the decoder thus far described is largely conventional and its operation is best described with the aid of the waveforms illustrated in FIG. 2. Since the decoder shown in FIG. 1 is only a four-digit decoder, each received PCM code group consists of marks and spaces in only four predetermined spaced time slots. These time slots are marked off at the top of FIG. 2, with each time interval intervening between successive time slots serving as a crosstalk preventing guard space. Line (*a*) of FIG. 2, labeled +PCM, shows the code groups 1011, 0110, 1001, 0010, and 0000 following one another in rapid succession. These PCM code groups are conventional binary representations of signal samples having relative numerical amplitudes of 11, 6, 9, 2, and 0, respectively. The +PCM wave, which may itself be transmitted, is positive during each mark or "1," negative during each space or "0," and negative during each guard space between time slots. In the illustrated embodiments, for reasons unrelated to the present invention, the same intelligence is transmitted in the form of the so-called −PCM′ wave shown in line *b* of FIG. 2. This wave is the inverse of the +PCM wave in that it has a mark for each space in the +PCM wave and a space for each mark in the +PCM wave. In addition, it is negative during each mark, positive during each space, and positive during each guard space. The information content of the wave, however, is obviously the same.

The −D3 and −D4 timing generator leads in FIG. 1 bear the waveforms, illustrated in lines *c* and *d*, respectively, of FIG. 2. The −D3 lead is negative during the third time slot of each code group and the −D4 lead is negative during the fourth. Both leads are positive at all other times. The timing generator itself, which is not shown, may take the general form of the permanent or non-recurring portion of the pulse distributor shown in application Serial No. 704,929, filed December 24, 1957, by H. M. Jamison and R. L. Wilson.

In operation, the PCM decoder illustrated in FIG. 1 receives on input lead 10 the −PCM′ wave shown in line *b* of FIG. 2. A negative-going signal on lead 10 triggers regenerative pulse amplifier 11, causing a positive-going pulse to appear on output lead A and a negative-going pulse to appear on digit time later on output lead B, as shown in lines *e* and *f*, respectively, of FIG. 2. The output pulse on lead B is delayed an additional digit interval by delay line 12 and applied to the input of regenerative pulse amplifier 13 and the process repeats itself, as shown in lines *g* and *h* of FIG. 2. The negative-going output pulse on lead B of regenerative pulse amplifier 13 is delayed another digit interval by delay line 14 and triggers regenerative pulse amplifier 15, again resulting in a positive-going output pulse on lead A and a negative-going output pulse one digit interval later on lead B. These are shown in lines *i* and *j* of FIG. 2. The latter pulse, delayed another digit interval by delay line 16, triggers regenerative pulse amplifier 17, as shown in line *k* of FIG. 2. As a result, during the fourth time slot, the −PCM′ wave received in serial form on input bus 10, is displayed in parallel form on the A output leads of the regenerative pulse amplifiers as a +PCM′ wave. Each mark is represented on its A output lead during this time slot by a positive voltage and each space by a negative voltage. All A leads are negative during guard spaces.

As shown in line *d* of FIG. 2, the −D4 lead in the FIG. 1 is negative during the fourth time slot. Amplifier 22 inverts the wave on the −D4 lead, however, producing a positive voltage at AND gates 18 through 21. Only those AND gates receiving positive voltages from their respective regenerative pulse amplifiers are operated. The AND gates that are operated in this manner trigger their respective flip-flops and connect their respective switches to ground. The other switches remain connected to the reference potential. The action of switches 28 through 31, in response to differing code groups, is illustrated in lines *l* through *o*, respectively, of FIG. 2.

In substantially the same way that each reconstructed signal amplitude sample is initiated during the fourth time slot by a pulse on the −D4 timing generator lead, each sample is terminated during the succeeding third time slot by a pulse on the −D3 lead. The guard space thereby provided between samples is important in preventing undesired crosstalk between successive sample pulses. A negative-going pulse on the −D3 lead, illustrated in line *c* of FIG. 2, is inverted by amplifier 27 and used to return flip-flops 23 through 26 to their original state. Weighting resistors 32 through 35 are all thereby returned to the reference potential.

Absent the present invention, the resulting signal amplitude samples reconstructed on output bus 36 from the currents passed by the energized weighting resistors would be unipolar in form, with signal excursions extending positively toward ground potential from the reference potential. Such pulses would have a direct current component which would not only be substantial but would also vary considerably in amplitude with time. The unipolar nature of the reconstructed signal amplitude samples would prevent their use later in balanced circuitry and the varying direct current component would result in considerable distortion if later circuitry required its removal.

In accordance with the present invention, the problem is solved by the addition of an auxiliary resistor 37 and some associated circuitry to the weighting network. Resistor 37 has a resistance value R equal to that of the smallest network resistor 35, i.e., that representing the most significant digit of the received code group. Resistor 37 is returned either to the reference potential or to ground by a switch 38 which is itself controlled by a flip-flop or binary counter circuit 39. The two inputs of flip-flop 39 are connected to the output terminals of linear amplifiers 22 and 27, respectively.

In operation, the invention permits signal amplitude samples to be reconstructed on output bus 36 in bipolar form. Each negative-going pulse on the −D3 lead is inverted by amplifier 27 and triggers flip-flop 39, connecting switch 38 to ground. Each negative-going pulse on the −D4 lead is inverted in a similar manner by amplifier 22 and triggers flip-flop 39 in the other direction, returning switch 38 to the negative reference potential $-E_{REF}$. This sequence is illustrated in line *p* of FIG. 2. Since weighting resistors 32 through 35 are, when selected under the control of the received code groups, connected to the negative reference potential while auxiliary resistor 37 is connected to ground and to ground while auxiliary resistor 37 is connected to the negative reference potential, auxiliary resistor 37 can be said to be connected back and forth between the negative reference potential and ground in phase opposition to the network weighting resistors.

The resulting bipolar pulses on output bus 36 are shown in line (*q*) of FIG. 2. These pulses can be called pulse amplitude modulation (PAM) pulses, since their principal significance lies in their amplitude. Instead of extending positively toward ground from the reference potential, however, they can extend in either direction from an intermediate reference potential. In the illustrated example, the intermediate reference potential is $-\frac{2}{3}E_{REF}$. As illustrated in line *q* of FIG. 2, the first sample, which has a relative numerical amplitude of 11, extends negatively from the intermediate reference potential while the second sample, which has a relative numerical amplitude of 6, extends slightly in the positive direction. The envelope of bipolar PAM pulses on output bus 36 is shown in line *r* of FIG. 2.

Since they extend in either direction from an intermediate reference potential, the reconstructed signal amplitude samples have a waveform which permits them to pass readily through any following balanced circuitry. While they still have a direct current component, it is a substantially constant one which can be removed by coupling transformers or capacitors without any adverse effect upon their accuracy as signal amplitude samples.

Application of the invention to a full-scale commercial quality PCM decoder is shown in FIGS. 3 and 4. These figures, when placed side by side with like-lettered leads connected together, illustrate a full seven-digit decoder which amounts to a more elaborate version of the embodiment of the invention shown in FIG. 1. All of the transistors contained in the decoder are of the p-n-p type unless otherwise designated.

In FIG. 3, as in FIG. 1, a so-called —PCM' wave is received on an input bus 10. As before, this wave is normally positive, but goes negative during a received mark. Input bus 10 is connected through a diode 45 and a resistor 46 to the base electrode of a transistor 47. Diode 45 is poled for easy current flow toward transistor 47 and is, in the absence of a negative input pulse, held forward biased by a resistor 48, which is returned from its anode to a positive potential, and a resistor 49, which is returned from its cathode to a negative potential.

Transistor 47 and its associated circuitry form a regenerative pulse amplifier, i.e., an amplifier which generates a completely new standardized pulse from each pulse received within predetermined time limits at its input circuits. Transistor 47 is connected in common emitter configuration, with its emitter electrode grounded, and its collector returned to a negative potential through the primary windings of a pair of transformers 50 and 51. Transformer 50 is a phase-inverting transformer providing positive feedback and its secondary winding is connected in series with a diode 52 between the base of transistor 47 and a positive potential. Diode 52 is poled for easy current flow away from transistor 47. The base electrode of transistor 47 is also connected through a diode 53 to a "clock" source which supplies a sinusoidal waveform at a frequency equal to the basic pulse repetition rate of the system. Diode 53 is poled for easy current flow toward the base of transistor 47.

The regenerative pulse amplifier formed by transistor 47 and its associated circuitry has two output circuits. The first of these, corresponding to output A of any of the regenerative pulse amplifiers in FIG. 1, is formed by the lower secondary winding of transformer 51. This lower secondary winding has a pair of oppositely poled diodes 54 and 55 connected in series across it. The anodes of diodes 54 and 55 are connected together and returned to a small negative potential. The second regenerative amplifier output circuit, corresponding to output B of any of the regenerative pulse amplifiers in FIG. 1, is formed by the upper secondary winding of transformer 51. One end of this winding is returned to a small positive potential, while the other is connected to a diode 56.

The first output connection from the regenerative pulse amplifier formed by transistor 47 and its associated circuitry is from the cathode of diode 55 to one of the input leads of an AND gate formed by a pair of diodes 60 and 61. The cathode of diode 55 is connected directly to the cathode of diode 60. The cathode of diode 61 forms the other AND gate input terminal. The AND gate is completed by a resistor 62, which is connected to a positive potential from the common anodes of diodes 60 and 61. The cathode of diode 55 in the regenerative amplifier output circuit is also returned to a negative potential through a resistor 63.

In the embodiment of the invention illustrated in FIGS. 3 and 4, the waveform on the —D7 lead of a suitable timing pulse generator performs the function of that on the —D4 lead in FIG. 1, while the waveform on the —D3 lead performs the function of that on the —D3 lead in FIG. 1. A negative-going pulse during the seventh time slot, in other words, initiates the reconstruction of each signal amplitude sample, while a negative-going pulse during the third time slot of the next code group signals its termination.

The —D7 lead in FIG. 3 is connected to the diode 61 AND gate terminal through a phase-inverting linear amplifier made up of a transistor 73 and its associated circuitry. The —D7 lead is connected to the base electrode of transistor 73 through the parallel combination of a resistor 64 and a capacitor 65. Transistor 73 is connected in the so-called common emitter configuration, with the emitter electrode grounded. The collector electrode is connected to a negative potential through the series combination of a dropping resistor 66 and a back-biased avalanche breakdown diode 67 serving as a voltage regulator. The junction between resistor 66 and breakdown diode 67 is returned to ground through the parallel combination of a resistor 68 and a bypass capacitor 69. The amplified, inverted output of transistor 73 is taken from the collector electrode through a coupling capacitor 70 and applied to the cathode of AND gate diode 61. The side of capacitor 70 nearest diode 61 is returned to a relatively large negative potential through a resistor 71 and to a much smaller negative potential through a back-biased diode 72.

Controlled by the AND gate made up of diodes 60 and 61 is a flip-flop or binary counter circuit composed of a pair of transistors 75 and 76. Transistors 75 and 76 are both connected in the so-called common emitter configuration, with the emitter electrodes grounded and the collector electrodes connected to a negative potential through respective dropping resistors 77 and 78. The base electrodes are connected together through the series combination of a pair of resistors 79 and 80, and the junction between the two resistors 79 and 80 is returned to a positive potential. The collector of transistor 75 is cross-connected to the base of transistor 76 through a resistor 81, and the collector of transistor 76 is cross-connected to the base of transistor 75 through the parallel combination of a resistor 82 and a bypass capacitor 83. A diode 84 is connected from the anodes of AND gate diodes 60 and 61 to the base electrode of transistor 75 and is poled for easy current flow toward the latter.

The inverted waveform from the timing generator —D3 lead is coupled to the base electrode of flip-flop transistor 76 through a diode 85. Diode 85 is poled for easy current flow toward transistor 76. The intervening phase-inverting amplifier makes use of a transistor 86, but since the amplifier itself is identical to the —D7 amplifier made up of transistor 73 and its associated circuitry, it will not be redescribed.

In the embodiment of the invention illustrated in FIGS. 3 and 4, second stage flip-flop transistor 76 itself serves the purpose of switch 28 in FIG. 1. Its collector electrode is, therefore, connected directly through a decorder network weighting resistor 87 to the decoder output bus 36. The collector of transistor 76 is also connected through a diode 88 to the negative reference potential. Diode 88 is poled for easy current flow toward transistor 76.

The remaining segments of the decoder are substantially identical to those which have already been described. The anode of diode 56 in the upper output circuit from regenerative pulse amplifier transistor 47 is connected through a single-digit delay line 89 to the next regenerative pulse amplifier. The output end of delay line 89 is connected to a positive potential through a resistor 90, as well as through a resistor 91 to the base electrode of the transistor 92 forming the next regenerative pulse amplifier. A succession of similar regenerative pulse amplifiers follows, as in FIG. 1. The seventh regenerative pulse amplifier is shown in the upper right-hand corner of FIG. 4 and is like all the rest but lacks an output circuit corresponding to the upper secondary winding of transformer 51 in FIG. 3 for the reason that it is the final stage of the shift register.

The flip-flop or binary counter circuits controlled by the remaining regenerative pulse amplifiers are all identical to the one formed by transistors 75 and 76. The first stage of each is controlled by an AND gate receiving signals from both the corresponding regenerative pulse amplifier and the —D7 lead of the timing generator, while the second stage of each is controlled by the —D3 lead of the timing generator. In each instance, the second stage of the flip-flop serves also as a switch and the transistor collector electrode is connected to the decoder output bus 36 through a respective one of the remaining network weighting resistors 101 through 106. The same transistor collector electrodes are also connected directly to the negative reference potential through respective ones of diodes 107 through 112. Diodes 107 through 112 are poled for easy current flow away from the reference bus and are, hence, normally back biased.

The portions of the decoder which have been described thus far are conventional and would, but for the present invention, reconstruct on output bus 36 a unipolar train of signal amplitude samples. In the upper left-hand corner of FIG. 3, when the incoming —PCM′ wave is positive, as it is in the absence of a mark, diode 45 is forward biased and transistor 47 is held in its non-conducting state. When the —PCM′ wave goes negative, however, diode 45 is blocked and the negative potential on resistor 49 tends to bias the emitter-base junction of transistor 47 in the forward direction. It cannot do so as long as the "clock" signal on the base of transistor 47 is positive. As soon as the "clock" signal becomes negative, however, the base potential of transistor 47 is free to drop. Regenerative action through feedback transformer 50 increases the condition until the "clock" signal goes positive once again, cutting transistor 47 off and terminating the regenerated pulse.

As has already been indicated, transformer 51 provides two outputs from the regenerative pulse amplifier. Diode 54 clips the overshoot of one, resulting in a positive-going undelayed pulse at the cathode of AND gate diode 60. Diode 56 clips the positive-going portion of the other and passes only the overshoot, resulting in a negative-going pulse delayed by one pulse length at the input end of delay line 89. Delay line 89 delays the negative-going pulse by another pulse length, causing a negative-going pulse to appear at the base of transistor 92 in the next regenerative pulse amplifier one full time slot after the original negative-going pulse appeared on input bus 10.

As explained in connection with the simplified embodiment of the invention illustrated in FIG. 1, a mark in the input —PCM′ pulse train advances through the shift register one step each time slot until the final time slot occurs. In the seven-digit decoder illustrated in FIGS. 3 and 4, each received code group contains seven time slots and, if a mark is encountered in the first time slot, it will advance all the way to the seventh or final regenerative pulse amplifier.

The respective flip-flop or binary counter circuits are triggered during the seventh time slot only if pulses appear from their corresponding regenerative pulse amplifiers. The action of these flip-flops may be explained best by considering the operation of the one composed of transistors 75 and 76. In that circuit, the left-hand transistor 75 is conducting up until the seventh time slot. During that time slot, a positive-going pulse always appears at the cathode of AND gate diode 61. Unless a similar pulse also appears at the cathode of AND gate diode 60, however, diode 84 remains back biased and transistor 75 continues to conduct. If transistor 75 continues to conduct, transistor 76 remains shut off and its collector electrode remains at a negative potential, forward biasing diode 88 and connecting output bus 36 through weighting resistor 87 to the negative reference potential. If a positive-going pulse appears at the cathode of AND gate diode 60 during the seventh time slot, the positive potential on resistor 62 is permitted to forward bias diode 84 and place a reverse bias on the emitter-base junction of transistor 75, shutting transistor 75 off. When transistor 75 shuts off, its collector potential becomes more negative and the cross-coupling to the base of transistor 76 turns the latter transistor on. When right-hand transistor 76 conducts, its collector potential rises toward ground, effectively grounding network weighting resistor 87 and isolating resistor 87 from the negative reference potential.

The flip-flop then remains in the condition it finds itself at the end of the seventh time slot until the third time slot of the next code group. The two time slots intervening provide a guard space to prevent crosstalk between successive reconstructed signal amplitude samples. During the third time slot of the next code group, a positive-going pulse always appears at the collector electrode of transistor 86 and is passed to the anode of flip-flop control diode 85. If the third time slot finds right-hand flip-flop transistor 76 shut off, this positive-going pulse does nothing, leaving weighting resistor 87 connected to the negative reference potential. If it finds transistor 76 conducting, however, it raises the potential on the base electrode of transistor 76 above ground, reverse biasing the emitter-base junction of transistor 76 and shutting transistor 76 off, connecting weighting resistor 87 to the negative reference potential. As transistor 76 shuts off, the cross-coupling connection from its collector electrode from the base of transistor 75 turns on the latter transistor.

Since the manner in which signal amplitude samples are reconstructed on output bus 36 has been described fully in connection with FIG. 1, it will not be redescribed. Suffice it to say that the most significant digit of the received PCM code group controls the connection of weighting resistor 106 while the least significant digit controls the connection of weighting resistor 87. The weighting resistors have values of resistances related to one another by powers of two, with resistor 106 having a normal value R, resistor 105 a value 2R, resistor 104 a value 4R, resistor 103 a value 8R, resistor 102 a value 16R, resistor 101 a value 32R, and resistor 87 a value 64R.

In accordance with an important feature of the invention, output bus 36 of the decoder illustrated in FIGS. 3 and 4 is returned through an auxiliary weighting resistor 115 to an additional flip-flop circuit. This additional flip-flop is made up of a pair of transistors 116 and 117 and is, in general, identical to the flip-flops that have already been described. It is redescribed here only to permit its operation to be examined in more detail.

In the additional flip-flop or binary counter circuit provided by the present invention, both transistors 116 and 117 have their emitter electrodes grounded and their collector electrodes connected to a negative potential through respective dropping resistors 118 and 119. Two resistors 120 and 121 are connected in series between the two transistor base electrodes and the junction between resistors 120 and 121 is connected to a positive potential. The collector of left-hand transistor 116 is cross-coupled to the base of right-hand transistor 117 through a resistor 122, while the collector of right-hand transistor 117 is cross-coupled to the base of left-hand transistor 116 through the parallel combination of a resistor 123 and a capacitor 124. A control diode 125 is connected to the base of transistor 116 from the output of —D3 amplifier 86, while a similar control diode 126 is connected to the base of transistor 117 from the output of —D7 amplifier 73. Both diodes 125 and 126 are poled for easy current flow toward their respective flip-flop transistors. Auxiliary weighting resistor 115 is connected from output bus 36 to the collector electrode of transistor 117 and a final diode 127 is connected from the collector electrode of transistor 117 to the negative reference potential. Diode 127 is poled for easy current flow toward transistor 117.

In operation, the additional flip-flop provided by the present invention connects auxiliary weighting resistor 115 to the negative reference potential during the seventh time slot and leaves it there until the third time slot of the next code group, when it returns resistor 115 to ground. The additional flip-flop connects auxiliary weighting resistor 115, in other words, back and forth between the reference potential and ground in phase opposition to the selected ones of the regular network weighting resistors.

Prior to the seventh time slot, left-hand flip-flop transistor 116 is shut off and right-hand transistor 117 is conducting. While transistor 117 conducts, auxiliary weighting resistor 115 is effectively grounded. During the seventh time slot, a positive-going pulse appears at the anode of diode 126, forward biasing that diode and raising the base potential of transistor 117 above ground. Such action shuts transistor 117 off, causing the collector potential of transistor 117 to become sufficiently negative to forward bias diode 127 and clamp resistor 115 to the negative reference potential. The flip-flop remains with transistor 117 shut off and transistor 116 conducting, then, until the third time slot of the next code group. During the third time slot, a positive-going pulse appears on the anode of diode 125, raising the base potential of transistor 116 and shutting that transistor off. As transistor 116 shuts off, transistor 117 becomes conducting once again and resistor 115 is once again clamped to ground.

As explained previously, the resulting signal amplitude samples that are reconstructed on output bus 36 are bipolar in form and have a direct current component that is substantially constant over a period of time. They can, therefore, be passed through balanced circuitry successfully and can have that direct current component removed with no loss in accuracy.

It is to be understood that the above-described arrangements are illustrative of the application of the principles of the invention. Numerous other arrangements may be devised by those skilled in the art without departing from the spirit and scope of the invention.

What is claimed is:

1. In a pulse modulation system, an output bus for pulses of direct current of varying amplitude, a plurality of current supply resistors connected to said output bus and having respectively different values of resistance, means to return selected ones of said resistors to a first direct reference potential during predetermined spaced time intervals, to return any remaining ones of said resistors to a second direct reference potential during said predetermined spaced time intervals, and to return all of said resistors to said second direct reference potential between said predetermined spaced time intervals, and means to convert the resulting pulses of direct current on said output bus to bipolar pulses which comprises an additional resistor connected to said output bus, and means to return said additional resistor to said second direct reference potential during said predetermined spaced time intervals and to said first direct reference potential between said predetermined spaced time intervals.

2. In a pulse modulation system, an output bus for pulses of direct current of varying amplitude, a plurality of current supply resistors connected to said output bus and having respectively different values of resistance related to one another by powers of two, means to return selected ones of said resistors to a first direct reference potential during predetermined spaced time intervals, to return any remaining ones of said resistors to a second direct reference potential during said predeterminad spaced time intervals, and to return all of said resistors to said second direct reference potential between said predetermined spaced time intervals, and means to convert the resulting pulses of direct current on said output bus to bipolar pulses which comprises an additional resistor connected to said output bus and having a value of resistance substantially equal to that of one of said current supply resistors, and means to return said additional resistor to said second direct reference potential during said predetermined spaced time intervals and to said first direct reference potential between said predetermined spaced time intervals.

3. A combination in accordance with claim 2 in which said additional resistor has a value of resistance substantially equal to that of the smallest of said current supply resistors.

4. In a pulse code modulation decoder for reconstructing signal amplitude samples from received code groups each composed of combinations of marks and spaces in successive time slots, an output bus for said reconstructed signal amplitude samples, a plurality of current supply resistors connected to said output bus and having respectively different values of resistance, means controlled by said received code groups to return selected ones of said resistors substantially simultaneously to a first direct reference potential during predetermined spaced time intervals corresponding to respective received code groups and to return any remaining ones of said resistors to a second direct reference potential during said predetermined spaced time intervals, means to return all of said resistors to said second direct reference potential between said predetermined spaced time intervals, and means to convert the resulting pulses of direct current on said output bus to bipolar pulses which comprises an additional resistor connected to said output bus, and means to return said additional resistor to said second direct reference potential during said predetermined spaced time intervals and to said first direct reference potential between said predetermined spaced time intervals.

5. In a pulse code modulation decoder for reconstructing signal amplitude samples from received code groups each composed of combinations of marks and spaces in successive time slots, an output bus for said reconstructed signal amplitude samples, a plurality of current supply resistors connected to said output bus and having respectively different values of resistance related to one another by powers of two, means controlled by said received code groups to return selected ones of said resistors substantially simultaneously to a first direct reference potential during predetermined spaced time intervals corresponding to respective received code groups and to return any remaining ones of said resistors to a second direct reference potential during said predetermined spaced time intervals, means to return all of said resistors to said second direct reference potential between said predetermined spaced time intervals, and means to convert the resulting pulses of direct current on said output bus to bipolar pulses which comprises an additional resistor connected to said output bus and having a value of resistance substantially equal to that of one of said current supply resistors, and means to return said additional resistor to said second direct reference potential during said predetermined spaced time intervals and to said first direct reference potential between said predetermined spaced time intervals.

6. A combination in accordance with claim 5 in which said additional resistor has a value of resistance substantially equal to that of the smallest of said current supply resistors.

References Cited in the file of this patent

UNITED STATES PATENTS

| | | |
|---|---|---|
| 2,538,615 | Carbrey | Jan. 16, 1951 |
| 2,610,295 | Carbery | Sept. 9, 1952 |
| 2,658,139 | Abate | Nov. 3, 1953 |
| 2,884,523 | Kenyon | Apr. 28, 1959 |